(12) United States Patent
Cao et al.

(10) Patent No.: US 7,939,043 B2
(45) Date of Patent: May 10, 2011

(54) SYNTHESIS OF CHABAZITE STRUCTURE-CONTAINING MOLECULAR SIEVES AND THEIR USE IN THE CONVERSION OF OXYGENATES TO OLEFINS

(75) Inventors: Guang Cao, Branchburg, NJ (US); Matu J. Shah, Hackettstown, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 568 days.

(21) Appl. No.: 12/137,208

(22) Filed: Jun. 11, 2008

(65) Prior Publication Data

US 2009/0018379 A1    Jan. 15, 2009

Related U.S. Application Data

(60) Provisional application No. 60/949,302, filed on Jul. 12, 2007.

(51) Int. Cl.
*C01B 37/04* (2006.01)
*C01B 37/08* (2006.01)

(52) U.S. Cl. ...................................... 423/305
(58) Field of Classification Search .................. 423/704, 423/705, 305
See application file for complete search history.

(56) References Cited

U.S. PATENT DOCUMENTS

| | | | |
|---|---|---|---|
| 3,030,181 A | 4/1962 | Milton | |
| 4,440,871 A | 4/1984 | Lok et al. | |
| 4,544,538 A * | 10/1985 | Zones | 423/706 |
| 6,162,415 A | 12/2000 | Liu et al. | |
| 6,709,644 B2 * | 3/2004 | Zones et al. | 423/706 |
| 6,793,901 B2 | 9/2004 | Cao et al. | |
| 6,812,372 B2 | 11/2004 | Janssen et al. | |
| 6,835,363 B1 | 12/2004 | Strohmaier | |
| 2004/0082466 A1 * | 4/2004 | Cao et al. | 502/214 |
| 2004/0253163 A1 | 12/2004 | Cao et al. | |
| 2005/0065021 A1 | 3/2005 | Chang et al. | |
| 2007/0032378 A1 | 2/2007 | Karch et al. | |
| 2007/0043249 A1 | 2/2007 | Cao et al. | |
| 2008/0293990 A1 * | 11/2008 | Stevenson et al. | 585/500 |

FOREIGN PATENT DOCUMENTS

GB    868846    5/1961

* cited by examiner

*Primary Examiner* — David M Brunsman
(74) *Attorney, Agent, or Firm* — David M. Weisberg

(57) ABSTRACT

In a method of synthesizing a silicoaluminophosphate or aluminophosphate molecular sieve comprising a CHA framework-type material, a synthesis mixture is provided comprising a source of aluminum, a source of phosphorus, optionally a source of silicon and at least one organic template of formula (I):

$$[R^1R^2R^3R^4N]^+ X^- \qquad (I)$$

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion. The synthesis mixture can then be crystallized to produce the desired molecular sieve.

12 Claims, 3 Drawing Sheets

SYNTHESIS OF CHABAZITE STRUCTURE-CONTAINING MOLECULAR SIEVES AND THEIR USE IN THE CONVERSION OF OXYGENATES TO OLEFINS

CROSS-REFERENCE TO RELATED APPLICATIONS

The application claims priority from U.S. Provisional Application Ser. No. 60/949,302, filed Jul. 12, 2007, the contents of which are incorporated by reference in their entirety.

FIELD OF THE INVENTION

This invention relates to the synthesis of molecular sieves containing chabazite framework type materials and their use in the conversion of oxygenates, particularly methanol, to olefins, particularly ethylene and propylene.

BACKGROUND OF THE INVENTION

The conversion of oxygenates to olefins (OTO) is currently the subject of intense research because it has the potential for replacing the long-standing steam cracking technology that is today the industry-standard for producing world scale quantities of ethylene and propylene. The very large volumes involved suggest that substantial economic incentives exist for alternate technologies that can deliver high throughputs of light olefins in a cost efficient manner. Whereas steam cracking relies on non-selective thermal reactions of naphtha range hydrocarbons at very high temperatures, OTO exploits catalytic and micro-architectural properties of acidic molecular sieves under milder temperature conditions to produce high yields of ethylene and propylene from methanol.

Current understanding of the OTO reactions suggests a complex sequence in which three major steps can be identified: (1) an induction period leading to the formation of an active carbon pool (alkyl-aromatics), (2) alkylation-dealkylation reactions of these active intermediates leading to products, and (3) a gradual build-up of condensed ring aromatics. OTO is therefore an inherently transient chemical transformation in which the catalyst is in a continuous state of change. The ability of the catalyst to maintain high olefin yields for prolonged periods of time relies on a delicate balance between the relative rates at which the above processes take place. The formation of coke-like molecules is of singular importance because their accumulation interferes with the desired reaction sequence in a number of ways. In particular, coke renders the carbon pool inactive, lowers the rates of diffusion of reactants and products, increases the potential for undesired secondary reactions and limits catalyst life.

Over the last two decades, many catalytic materials have been identified as being useful for carrying out the OTO reactions. Crystalline molecular sieves are the preferred catalysts today because they simultaneously address the acidity and morphological requirements for the reactions. Particularly preferred materials are eight-membered ring aluminosilicates, such as those having the chabazite (CHA) framework type, as well as aluminophosphates (AlPOs) and silicoaluminophosphates (SAPOs) of the CHA framework type, such as SAPO-34.

Chabazite is a naturally occurring zeolite with the approximate formula $Ca_6Al_{12}Si_{24}O_{72}$. Three synthetic forms of chabazite are described in "Zeolite Molecular Sieves", by D. W. Breck, published in 1973 by John Wiley & Sons, the complete disclosure of which is incorporated herein by specific reference. The three synthetic forms reported by Breck are Zeolite "K-G", described in J. Chem. Soc., p. 2822 (1956), Barrer et al; Zeolite D, described in British Patent No. 868,846 (1961); and Zeolite R, described in U.S. Pat. No. 3,030,181 (1962). Zeolite K-G zeolite has a silica:alumina mole ratio of 2.3:1 to 4.15:1, whereas zeolites D and R have silica:alumina mole ratios of 4.5:1 to 4.9:1 and 3.45:1 to 3.65:1, respectively.

In U.S. Pat. No. 4,440,871, the synthesis of a wide variety of SAPO materials of various framework types is described with a number of specific examples. Also disclosed are a large number of possible organic templates, with some specific examples. In the specific examples a number of CHA framework type materials are described. The preparation of SAPO-34 is reported, using tetraethylammonium hydroxide (TEAOH), or isopropylamine, or mixtures of TEAOH and dipropylamine (DPA) as templates. Also disclosed is a specific example that utilizes cyclohexylamine in the preparation of SAPO-44. Although other template materials are described, there are no other templates indicated as being suitable for preparing SAPO's of the CHA framework type.

However, although TEAOH is an effective template in the production of SAPO molecular sieves having the CHA framework type, it is not a framework specific template. Thus TEAOH is also known to induce the formation of AEI framework type molecular sieves, such as $AlPO_4$-18 and SAPO-18. In fact, this dual structure-directing property has been exploited in the synthesis of intergrowths of CHA and AEI framework type molecular sieves, such as EMM-2 (see, for example, U.S. Pat. No. 6,812,372). However, the synthesis of intergrown molecular sieves is known to be difficult to control, both in the ratio of the different phases and in the crystal morphology of the product. There is therefore interest in finding alternatives to TEAOH as templates for the synthesis of chabazite-containing SAPO and $AlPO_4$ molecular sieves.

U.S. Pat. No. 6,162,415 discloses the synthesis of a silicoaluminophosphate molecular sieve, SAPO-44, which has a CHA framework type in the presence of a directing agent comprising cyclohexylamine or a cyclohexylammonium salt, such as cyclohexylammonium chloride or cyclohexylammonium bromide.

U.S. Pat. No. 6,793,901 discloses a method for preparing a microporous silicoaluminophosphate molecular sieve having the CHA framework type, which process comprises (a) forming a reaction mixture comprising a source of aluminum, a source of silicon, a source of phosphorus, optionally at least one source of fluoride ions and at least one template containing one or more N,N-dimethylamino moieties, (b) inducing crystallization of the silicoaluminophosphate molecular sieve from the reaction mixture, and (c) recovering silicoaluminophosphate molecular sieve from the reaction mixture. Suitable templates are said to include one or more of N,N-dimethylethanolamine, N,N-dimethylbutanolamine, N,N-dimethylheptanolamine, N,N-dimethyl-hexanolamine, N,N-dimethylethylenediamine, N,N-dimethylpropylenediamine, N,N-dimethylbutylenediamine, N,N-dimethylheptylenediamine, N,N-dimethyl-hexylenediamine, or dimethylethylamine, dimethylpropylamine, dimethyl-heptylamine and dimethylhexylamine.

U.S. Pat. No. 6,835,363 discloses a process for preparing microporous crystalline silicoaluminophosphate molecular sieves of CHA framework type, the process comprising: (a) providing a reaction mixture comprising a source of alumina, a source of phosphate, a source of silica, HF, and an organic template comprising one or more compounds of the formula:

where R is an alkyl radical of from 1 to 12 carbon atoms; (b) inducing crystallization of silicoaluminophosphate from the reaction mixture,; and (c) recovering silicoaluminophosphate molecular sieve. Suitable templates are said to include one or more of the group consisting of: N,N,N',N'-tetramethyl-1,3-propane-diamine, N,N,N',N'-tetramethyl-1,4-butanediamine, N,N,N',N'-tetramethyl-1,3-butanediamine, N,N,N', N'-tetramethyl-1,5-pentanediamine, N,N,N',N'-tetramethyl-1,6-hexanediamine, N,N,N',N'-tetramethyl-1,7-heptanediamine, N,N,N',N'-tetramethyl-1,8-octanediamine, N,N,N',N'-tetramethyl-1,9-nonanediamine N,N,N',N'-tetramethyl-1,10-decanediamine, N,N,N',N'-tetramethyl-1,11-undecanediamine and N,N,N',N'-tetramethyl-1,12-dodecanediamine.

U.S. Published Patent Application No. 2004/0253163, published Dec. 16, 2004, discloses the synthesis of silicoaluminophosphate molecular sieves having the CHA framework type employing a directing agent having the formula:

wherein $R^1$ and $R^2$ are independently selected from the group consisting of alkyl groups having from 1 to 3 carbon atoms and hydroxyalkyl groups having from 1 to 3 carbon atoms and $R^3$ is selected from the group consisting of 4- to 8-membered cycloalkyl groups, optionally substituted by 1 to 3 alkyl groups having from 1 to 3 carbon atoms; and 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S. Preferably, the directing agent is selected from N,N-dimethyl-cyclohexylamine, N,N-dimethyl-methyl-cyclohexylamine, N,N-dimethyl-cyclopentylamine, N,N-dimethyl-methyl-cyclopentylamine, N,N-dimethyl-cycloheptylamine, N,N-dimethyl-methylcycloheptylamine, and most preferably is N,N-dimethyl-cyclohexylamine.

U.S. Published Patent Application No. 2007/0043249, published Feb. 22, 2007, discloses method of synthesizing a crystalline aluminophosphate or silicoaluminophosphate molecular sieve having a CHA framework-type, the method comprising: a) providing a synthesis mixture comprising a source of aluminum, a source of phosphorus, optionally a source of silicon and at least one organic template of formula:

wherein $R^1$, $R^2$ and $R^3$ are independently selected from the group consisting of alkyl groups having from 1 to 3 carbon atoms and hydroxyalkyl groups having from 1 to 3 carbon atoms; $R^4$ is selected from the group consisting of 4- to 8-membered cycloalkyl groups, optionally substituted by 1 to 3 alkyl groups having from 1 to 3 carbon atoms; 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S; and aromatic groups optionally substituted by 1 to 3 alkyl groups, said alkyl groups having from 1 to 3 carbon atoms; and $X^-$ is an anion; and b) inducing crystallization of said crystalline molecular sieve having a CHA framework type.

According to the present invention, it has now been found that silicoaluminophosphates and aluminophosphates comprising CHA framework type molecular sieves can be synthesized using as a template a compound of the formula $[R^1R^2R^3R^4N]^+$ $X^-$ where $R^1$, $R^2$, $R^3$ and $R^4$ are each independently selected from acyclic alkyl groups having at least one carbon atom and wherein the total number of carbon atoms in the alkyl groups is greater than 8 but less than 16.

SUMMARY OF THE INVENTION

In one aspect, the invention resides in a method of synthesizing a silicoaluminophosphate or aluminophosphate molecular sieve comprising a CHA framework-type material, the method comprising:

(a) providing a synthesis mixture comprising a source of aluminum, a source of phosphorus, optionally a source of silicon, and at least one organic template of formula (I):

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion; and

(b) inducing crystallization of said synthesis mixture to form said molecular sieve.

Conveniently, said organic template is selected from tetrapropylammonium, methyltripropylammonium, ethyltripropylammonium, diethyldipropylammonium, methylethyldipropylammonium, and/or triethylpropylammonium compounds.

Conveniently, the molar ratio of template to aluminum in the synthesis mixture, expressed as the molar ratio of template to alumina ($Al_2O_3$), is within the range of from about 0.4:1 to about 4.0:1.

In one embodiment, the synthesis mixture also contains seeds. Conveniently, the synthesis mixture comprises from about 0.01 ppm by weight to about 10,000 ppm by weight of seeds, such as from about 100 ppm by weight to about 5,000 by weight of seeds. Typically, said seeds comprise a crystalline material having a CHA framework-type.

In a further aspect, the invention resides in an aluminophosphate or silicoaluminophosphate molecular sieve, comprising an CHA framework type material and, within its intracrystalline structure, at least one organic template of formula (I):

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion.

Conveniently, said molecular sieve further comprises an AEI framework type material.

In yet further aspects, the invention resides in a catalyst comprising an aluminophosphate or silicoaluminophosphate molecular sieve as described herein and in the use of the catalyst in the conversion of an organic oxygenate compound to olefins.

DETAILED DESCRIPTION OF THE INVENTION

The present invention provides a method for synthesizing crystalline aluminophosphates and silicoaluminophosphates composed partly or wholly of a CHA framework type material. In particular it has been found that certain alkylammonium compounds, namely those obeying the general formula (I):

$$[R^1R^2R^3R^4N]^+ X^- \qquad (I)$$

wherein each of $R^1$, $R^2$, $R^3$ and $R^4$ is independently an acyclic alkyl group having at least one carbon atom such that the total number of carbon atoms in the alkyl groups $R^1$, $R^2$, $R^3$, and $R^4$ is greater than 8 but less than 16, such as between 9 and 13, and wherein $X^-$ is an anion, are effective templates in directing the synthesis of aluminophosphate and silicoaluminophosphate molecular sieves containing the CHA framework type material. Moreover, it has been found that these templates can be used to prepare CHA framework type SAPO molecular sieves of high purity and low Si/Al atomic ratios (i.e., low acidity). In addition, the synthesis can be performed in the absence of fluoride ions, and the resultant product has generally uniform silicon distribution.

The present method generally involves the hydrothermal crystallization of a synthesis mixture comprising a source of aluminum, a source of phosphorous, at least one organic template, and, optionally, a source of silicon. The organic template includes at least one quaternary ammonium compound of formula (I) above, such as a tetrapropylammonium compound, a methyltripropylammonium compound, an ethyltripropylammonium compound, a diethyldipropylammonium compound, a methylethyldipropylammonium compound, and/or a triethylpropylammonium compound. Suitable anions for the compound of formula (I) include, but are not limited to, hydroxyl, halogen, phosphate, and acetate, especially hydroxide.

Typically, the template or mixture of templates is used in an amount such that the molar ratio of template to alumina ($Al_2O_3$) in the synthesis mixture is within the range of from about 0.4:1 to about 4.0:1, such as from about 0.6:1 to about 3.0:1.

The sources of aluminum, phosphorus, and silicon suitable for use in the synthesis of molecular sieves according to the present method are typically those known in the art or as described in the literature for the production of the SAPO or ALPO concerned. The aluminum source may be, for example, an aluminum oxide (alumina), optionally hydrated, an aluminum salt, especially a phosphate, an aluminate, or a mixture thereof. A suitable source is a hydrated alumina, especially pseudoboehmite, which contains about 75% $Al_2O_3$ and 25% $H_2O$ by weight. Advantageously, the source of phosphorus is a phosphoric acid, especially orthophosphoric acid, but other sources, for example, organic phosphates, e.g., triethyl phosphate, and aluminophosphates may be used. Advantageously, the source of silicon is silica, for example colloidal silica, fumed silica, or an organic silicon source, e.g., a tetraalkyl orthosilicate, especially tetraethyl orthosilicate.

Typically, the synthesis mixture also contains seeds to facilitate the crystallization process. The amount of seeds employed can vary widely, but generally the reaction mixture comprises from about 0.1 ppm by weight to about 10,000 ppm by weight, such as from about 100 ppm by weight to about 5,000 by weight, of said seeds. Generally, the seeds are homostructural with the desired product, that is, are of a CHA framework type material, although heterostructural seeds of, for example, an AEI, LEV, ERI, AFX, or OFF framework-type molecular sieve, may additionally or alternately be used. The seeds may be added to the reaction mixture as a colloidal suspension in a liquid medium, such as water. The production of colloidal seed suspensions and their use in the synthesis of molecular sieves are disclosed in, for example, International Publication Nos. WO 00/06493 and WO 00/06494, published on Feb. 10, 2000 and incorporated herein by reference.

Crystallization can be carried out at static or stirred conditions in a suitable reactor vessel, such as, for example, polypropylene jars or Teflon-lined or stainless steel autoclaves, at a temperature of about 120° C. to about 220° C., such as about 140° C. to about 200° C., for a time sufficient for crystallization to occur. Formation of the crystalline product can take anywhere from around 30 minutes up to as much as 2 weeks, such as from about 45 minutes to about 240 hours, for example from about 1.0 to about 120 hours. The duration can depend on the temperature employed, with higher temperatures typically requiring shorter hydrothermal treatments.

Typically, the crystalline product is formed in solution and can be recovered by standard means, such as by centrifugation or filtration. The separated product can also be washed, recovered by centrifugation or filtration, and dried. The resultant product can advantageously comprise particles with an average crystal size below 5 microns, such as below 2 microns, and typically about 1 micron or less.

The product of the crystallization process is typically an aluminophosphate or silicoaluminophosphate molecular sieve, comprising an CHA framework type material and, within its intra-crystalline structure, at least one organic template of formula (I):

$$[R^1R^2R^3R^4N]^+ X^- \qquad (I)$$

where each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion.

In its as-synthesized form, the crystalline material produced by the present method has the following composition on an anhydrous basis: $(m)Q:(Si_xAl_yP_z)O_2$, wherein Q represents at least one organic template of formula (I) and m is the number of moles of Q per mole of $(Si_xAl_yP_z)O_2$; m has a value from about 0.04 to about 0.17, such as from about 0.06 to about 0.13; and x, y, and z, respectively, represent the mole fraction of Si, Al, and P as tetrahedral oxides. Typically, x is from about 0 to about 0.2, y is from about 0.4 to about 0.6, and z is from about 0.3 to about 0.5.

In a preferred embodiment, the as-synthesized molecular sieve can be activated by removal of the organic template, leaving active catalytic sites within the microporous channels of the molecular sieve open for contact with a feedstock. The activation process is typically accomplished by heating the molecular sieve comprising the template at a temperature of from about 200° C. to about 800° C. in the presence of an oxygen-containing gas. In some cases, it may be desirable to heat the molecular sieve in an environment having a low or zero oxygen concentration. This type of process can be used for partial or complete removal of the organic directing agent from the intracrystalline pore system. In other cases, particularly with smaller organic directing agents, complete or partial removal from the sieve can be accomplished by conventional desorption processes.

Depending on the organic template and the conditions used in the synthesis, the molecular sieve remaining after the activation process may comprise a single phase CHA framework type material or an intergrowth of a CHA framework type material and an AEI framework type material, in which the CHA phase preferably predominates. In this respect, regular, single phase crystalline solids are built from structurally invariant building units, called Periodic Building Units, and are periodically ordered in three dimensions. Structurally disordered structures show periodic ordering in dimensions less than three, i.e. in two, one, or zero dimensions. This phenomenon is called stacking disorder of structurally invariant Periodic Building Units. Crystal structures built from Periodic Building Units are called end-member structures if periodic ordering is achieved in all three dimensions. Disordered structures are those where the stacking sequence of the Periodic Building Units deviates from periodic ordering up to statistical stacking sequences.

In the case of regular AEI and CHA framework type molecular sieves, the Periodic Building Unit is a double six ring layer. There are two types of layers "a" and "b", which are topologically identical except "b" is the mirror image of "a". When layers of the same type stack on top of one another, i.e., aaaaaaaa or bbbbbbbb, the framework type CHA is generated. When layers "a" and "b" alternate, i.e., abababab, the framework type AEI is generated. Intergrown AEI/CHA molecular sieves comprise regions of CHA framework type sequences and regions of AEI framework type sequences. Each change from a CHA to an AEI framework type sequence results in a stacking fault. In addition, stacking faults can occur in a pure CHA phase material when a sequence of one mirror image layers intersects a sequence of the opposite mirror image layers, such as, for example, in aaaaaabbbbbbb.

Intergrowths of CHA and AEI framework type molecular sieves and their characterization from their powder X-ray diffraction patterns using DIFFaX analysis (see M. M. J. Tracey et al., Proceedings of the Royal Chemical Society, London, A (1991), Vol. 433, pp. 499-520) is described in detail, e.g., in U.S. Pat. No. 6,812,372, the entire contents of which are incorporated herein by reference.

Once the present molecular sieve material has been synthesized, it can be formulated into a catalyst composition by combination with other materials, such as binders and/or matrix materials, which provide additional hardness or catalytic activity to the finished catalyst.

Materials which can be blended with the present molecular sieve material include a large variety of inert and catalytically active materials. These materials include compositions such as kaolin and other clays, various forms of rare earth metals, other non-zeolite catalyst components, zeolite catalyst components, alumina or alumina sol, titania, zirconia, quartz, silica or silica sol, and mixtures thereof. These components can also be effective in reducing overall catalyst cost, acting as a thermal sink to assist in heat shielding the catalyst during regeneration, densifying the catalyst, and/or increasing catalyst strength. When blended with such components, the amount of present CHA-containing crystalline material contained in the final catalyst product ranges from 10 to 90 weight percent of the total catalyst, preferably 20 to 80 weight percent of the total catalyst.

The CHA-containing crystalline material described herein can be used to dry gases and liquids; for selective molecular separation based on size and polar properties; as an ion-exchanger; as a chemical carrier; in gas chromatography; and as a catalyst in organic conversion reactions. Examples of suitable catalytic uses of the CHA-containing crystalline material described herein include, but are not limited to: (a) hydrocracking of heavy petroleum residual feedstocks, cyclic stocks and other hydrocrackate charge stocks, normally in the presence of a hydrogenation component selected from Groups 6 and 8 to 10 of the Periodic Table of Elements; (b) dewaxing, including isomerization dewaxing, to selectively remove straight chain paraffins from hydrocarbon feedstocks typically boiling above 177° C., including raffinates and lubricating oil basestocks; (c) catalytic cracking of hydrocarbon feedstocks, such as naphthas, gas oils and residual oils, normally in the presence of a large pore cracking catalyst, such as zeolite Y; (d) oligomerization of straight and branched chain olefins having from about 2 to 21, preferably 2 to 5 carbon atoms, to produce medium to heavy olefins which are useful for both fuels, i.e., gasoline or a gasoline blending stock, and chemicals; (e) isomerization of olefins, particularly olefins having 4 to 6 carbon atoms, and especially normal butene to produce iso-olefins; (f) upgrading of lower alkanes, such as methane, to higher hydrocarbons, such as ethylene and benzene; (g) disproportionation of alkylaromatic hydrocarbons, such as toluene, to produce dialkylaromatic hydrocarbons, such as xylenes; (h) alkylation of aromatic hydrocarbons, such as benzene, with olefins, such as ethylene and propylene to produce ethylbenzene and cumene; (i) isomerization of dialkylaromatic hydrocarbons, such as xylenes, (j) catalytic reduction of nitrogen oxides; and (k) synthesis of monoalkylamines and dialkylamines.

In particular, the CHA-containing crystalline material described herein can be useful as a catalyst in the conversion of oxygenates to one or more olefins, particularly ethylene and propylene. As used herein, the term "oxygenates" is defined to include, but is not necessarily limited to, aliphatic alcohols, ethers, carbonyl compounds (aldehydes, ketones, carboxylic acids, carbonates, and the like), and also compounds containing hetero-atoms, such as halides, mercaptans, sulfides, amines, and mixtures thereof. The aliphatic moiety will normally contain from about 1 to about 10 carbon atoms, such as from about 1 to about 4 carbon atoms.

Representative oxygenates can include lower straight chain or branched aliphatic alcohols, their unsaturated counterparts, and their nitrogen, halogen and sulfur analogues. Examples of suitable oxygenate compounds include, but are not limited to: methanol; ethanol; n-propanol; isopropanol; $C_4$ to $C_{10}$ alcohols; methyl ethyl ether; dimethyl ether; diethyl ether; di-isopropyl ether; methyl mercaptan; methyl sulfide; methyl amine; ethyl mercaptan; di-ethyl sulfide; di-ethyl amine; ethyl chloride; formaldehyde; di-methyl carbonate; di-methyl ketone; acetic acid; n-alkyl amines; n-alkyl halides; n-alkyl sulfides having n-alkyl groups of comprising the range of from about 3 to about 10 carbon atoms; and mixtures thereof. Particularly suitable oxygenate compounds include methanol, dimethyl ether, and mixtures thereof, preferably methanol. As used herein, the term "oxygenate" designates only the organic material used as the feed. The total charge of feed to the reaction zone may contain additional compounds, such as diluents.

In the present oxygenate conversion process, a feedstock comprising an organic oxygenate, optionally with one or more diluents, can be contacted in the vapor phase in a reaction zone with a catalyst comprising the present molecular sieve at effective process conditions so as to produce the desired olefins. Alternatively, the process may be carried out in a liquid or a mixed vapor/liquid phase. When the process is carried out in the liquid phase or a mixed vapor/liquid phase, different conversion rates and selectivities of feedstock-to-product may result depending upon the catalyst and the reaction conditions.

When present, the diluent(s) is(are) generally non-reactive to the feedstock or molecular sieve catalyst composition and is(are) typically used to reduce the concentration of the oxygenate in the feedstock. Non-limiting examples of suitable diluents include, but are not limited to, helium, argon, nitrogen, carbon monoxide, carbon dioxide, water, essentially non-reactive paraffins (especially alkanes such as methane, ethane, and propane), essentially non-reactive aromatic compounds, and mixtures thereof. Preferred diluents can include water and nitrogen, with water being particularly preferred. The diluent(s) may comprise from about 1 mol % to about 99 mol % of the total feed mixture.

The temperature employed in the oxygenate conversion process may vary over a wide range, such as from about 200° C. to about 1000° C., for example from about 250° C. to about 800° C., from about 250° C. to about 750° C., from about 300° C. to about 650° C., from about 350° C. to about 600° C., or from about 400° C. to about 600° C.

Light olefin products will typically form, although not necessarily in optimum amounts, at a wide range of pressures, including but not limited to autogenous pressures and pressures in the range of from about 0.1 kPa to about 10 MPa. Conveniently, the pressure can be in the range of from about 7 kPa to about 5 MPa, such as in the range of from about 50 kPa to about 1 MPa. The foregoing pressures are exclusive of diluent, if any is present, and refer to the partial pressure of the feedstock as it relates to oxygenate compounds and/or mixtures thereof. Lower and upper extremes of pressure may adversely affect selectivity, conversion, coking rate, and/or reaction rate; however, light olefins such as ethylene still may form.

The process should be continued for a period of time sufficient to produce the desired olefin products. The reaction time may vary from tenths of seconds to a number of hours. The reaction time can be largely determined by the reaction temperature, the pressure, the catalyst selected, the weight hourly space velocity, the phase (liquid or vapor), and the selected process design characteristics, inter alia.

A wide range of weight hourly space velocities (WHSV) for the feedstock will typically function in the present process. WHSV is defined as weight of feed (excluding diluent) per hour per weight of a total reaction volume of molecular sieve catalyst (excluding inerts and/or fillers). The WHSV generally should be in the range of from about 0.01 hr$^{-1}$ to about 500 hr$^{-1}$, such as in the range of from about 0.5 hr$^{-1}$ to about 300 hr$^{-1}$, for example in the range of from about 0.1 hr$^{-1}$ to about 200 hr$^{-1}$.

A practical embodiment of a reactor system for the oxygenate conversion process is a circulating fluid bed reactor with continuous regeneration, similar to a modern fluid catalytic cracker. Fixed beds are generally not preferred for the process because oxygenate to olefin conversion is a highly exothermic process which requires several stages with intercoolers or other cooling devices. The reaction also results in a high pressure drop due to the production of low pressure, low density gas.

Because the catalyst must be regenerated frequently, the reactor should allow easy removal of a portion of the catalyst to a regenerator, where the catalyst is subjected to a regeneration medium, such as a gas comprising oxygen, for example air, to burn off coke from the catalyst, which restores the catalyst activity. The conditions of temperature, oxygen partial pressure, and residence time in the regenerator should be selected to achieve a coke content on regenerated catalyst of less than about 0.5 wt %. At least a portion of the regenerated catalyst should be returned to the reactor.

In one embodiment, prior to being used to convert oxygenate to olefins, the catalyst can be pretreated with dimethyl ether, a $C_2$-$C_4$ aldehyde composition and/or a $C_4$-$C_7$ olefin composition to form an integrated hydrocarbon co-catalyst within the porous framework of the intergrown molecular sieve. Desirably, the pretreatment can be conducted at a temperature of at least 10° C., such as at least 25° C., for example at least 50° C., higher than the temperature used for the oxygenate reaction zone and can be arranged to produce at least 0.1 wt %, such as at least 1 wt %, for example at least about 5 wt % of the integrated hydrocarbon co-catalyst, based on total weight of the molecular sieve. Such preliminary treating to increase the carbon content of the molecular sieve is known as "pre-pooling" and is further described in U.S. application Ser. Nos. 10/712,668, 10/712,952, and 10/712,953, all of which were filed Nov. 12, 2003 and are fully incorporated herein by reference.

Additionally or alternately, the invention can be described by the following embodiments:

Embodiment 1. A method of synthesizing a silicoaluminophosphate or aluminophosphate molecular sieve comprising a CHA framework-type material, the method comprising: (a) providing a synthesis mixture comprising a source of aluminum, a source of phosphorus, optionally a source of silicon, and at least one organic template of formula (I):

$$[R^1R^2R^3R^4N]^+ \, X^- \qquad (I)$$

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion; and (b) inducing crystallization of said synthesis mixture to form said molecular sieve.

Embodiment 2. The method of embodiment 1, wherein the total number of carbon atoms in said alkyl groups $R^1$, $R^2$, $R^3$, and $R^4$ is from 9 to 13.

Embodiment 3. The method of any of embodiments 1-2, wherein said organic template is selected from tetrapropylammonium, methyltripropylammonium, ethyltripropylammonium, diethyldipropyl-ammonium, methylethyldipropylammonium, and/or triethylpropyl-ammonium compounds.

Embodiment 4. The method of any of embodiments 1-3, wherein the molar ratio of template to aluminum in the synthesis mixture, expressed as the molar ratio of template to alumina ($Al_2O_3$), is within the range of from about 0.4:1 to about 4.0:1.

Embodiment 5. The method of any of embodiments 1-4, wherein the synthesis mixture also contains seeds.

Embodiment 6. The method of any of embodiments 1-5, wherein said synthesis mixture comprises from about 0.01 ppm by weight to about 10,000 ppm by weight of seeds.

Embodiment 7. The method of any of embodiments 1-6, wherein said synthesis mixture comprises from about 100 ppm by weight to about 5,000 by weight of seeds.

Embodiment 8. The method of any of embodiments 5-7, wherein said seeds comprise a crystalline material having a CHA framework-type.

Embodiment 9. The method of any of embodiments 1-8, wherein said synthesis mixture comprises a source of silicon present in an amount such that said mixture has a non-zero Si:Al$_2$ molar ratio up to about 0.6.

Embodiment 10. An aluminophosphate or silicoaluminophosphate molecular sieve, comprising an CHA framework type material and, within its intra-crystalline structure, at least one organic template of formula (I):

$$[R^1R^2R^3R^4N]^+ X^- \qquad (I)$$

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion.

Embodiment 11. The molecular sieve of embodiment 10, wherein said organic template is selected from tetrapropylammonium, methyltripropylammonium, ethyltripropylammonium, diethyldipropyl-ammonium, methylethyldipropylammonium, and/or triethylpropylammonium compounds.

Embodiment 12. The molecular sieve of any of embodiments 10-11, further comprising an AEI framework type material.

Embodiment 13. A catalyst composition comprising a calcined form of the aluminophosphate or silicoaluminophosphate molecular sieve according to any of embodiments 10-12.

Embodiment 14. A catalyst composition comprising a crystalline aluminophosphate or silicoaluminophosphate molecular sieve including a CHA framework-type material produced by the method of any of embodiments 1-9.

Embodiment 15. A process for producing olefins comprising contacting an organic oxygenate compound under oxygenate conversion conditions with the catalyst composition of any of embodiments 13-14.

The invention will now be more particularly described with reference to the following Examples, in which X-ray powder diffractograms were recorded on Siemens D500 diffractometer with voltage of 40 kV and current of 30 mA, using a Cu target and Ni-filter ($\lambda$=0.154 nm), and elemental analysis of Al, Si, and P was performed using inductively coupled plasma (ICP) spectroscopy.

EXAMPLE 1

Preparation of Templates

Ethyltripropylammonium Hydroxide (ETPAOH)

To a solution of 44.0 g tripropylamine (0.307 mole) in 50 g ethanol, contained in a polypropylene bottle and chilled with an ice bath, was added drop-wise 52.7 g iodoethane (0.338 mole) over 30 minutes with stirring. All chemicals were reagent grade from Aldrich and were used as received. The propylene bottle was sealed and the content was allowed to warm up to room temperature and then heated to 40° C. in an oven for two days. Chilling of the contents in a refrigerator resulted in the formation of iodide crystals. Two crops were harvested, which were then dissolved in deionized water and ion-exchanged (3×) with MTO-Dowex® SBR LCNG OH-Form anion exchanger until AgNO$_3$ test was negative for iodide. The resultant ETPAOH solution was then concentrated on a rotavap to 330 g, and the concentration of the solution was determined by titration with HCl to be 0.740 M or 13.9 wt %. The overall yield was 79%.

Methyltripropylammonium Hydroxide (MTPAOH)

A similar procedure as above was followed except iodomethane was used instead of iodoethane. After ion-exchange and solvent removal, a solution was obtained which had a concentration of 1.095 M, or 19.3 wt % (specific gravity, S.G., of 0.995 g/mL). Further removal of solvent (water) resulted in an MTPOH solution of 30.6 wt %.

Triethylpropylammonium Hydroxide (TEPAOH)

A similar procedure as above was again followed, but using iodopropane instead of iodoethane. After ion-exchange and solvent removal, an aqueous solution of TEPAOH was obtained, having a concentration of 2.711 M or 42.6 wt % (S.G.=1.026).

Diethyldipropylammonium Hydroxide (DEDPAOH)

60 g Na$_2$CO$_3$ was added to a solution of 40.0 g dipropylamine in 100 g ethanol, and to the mixture was further added 148 g iodoethane in five aliquots while the mixture was chilled in an ice-bath. The mixture was allowed to warm to and stand at room temperature for three days before Na$_2$CO$_3$ was filtered off and most of the solvent was removed. Acetone was added to precipitate more Na$_2$CO$_3$ which was then removed. Ethanol was used to further precipitate the remaining Na$_2$CO$_3$. To the ethanolic solution was added 50 g water, and the ethanol was removed via rotavapping. The aqueous iodide solution was ion-exchanged until AgNO$_3$ indicated the absence of iodide. The concentration of the DEDPAOH solution was determined to be 3.83 M, or 67.32 wt % (S.G.=0.9945).

EXAMPLE 2

Preparation of [Si—Al—P—O]-CHA using ETPAOH as Template

The following ingredients were mixed, in sequence, and blended into a uniform gel using a microhomogenizer (Tissue Tearor Model 98730 available from Biospec Products, Inc, USA): 85 wt % H$_3$PO$_4$ (obtained from Aldrich Chemical Company), H$_2$O, Catapal™ A (74 wt % Al$_2$O$_3$, available from CONDEA Vista Company, Texas, USA), Cabosil™ silica (available from Cabot Corporation, Illinois, USA), and then the ETPAOH obtained as described in Example 1. The molar ratio of the ingredients was as follows:

2.0 ETPAOH:1.0 Al$_2$O$_3$:0.3 SiO$_2$:1.0 P$_2$O$_5$:51 H$_2$O

The resultant gel was divided into two equal portions. To portion A was added 200 PPM colloidal SAPO-34 seeds while no seeds was added to portion B. Both gels were then sealed in Teflon-lined Parr autoclaves. The autoclaves were placed in an oven whose temperature was set at 180° C. The autoclave containing A was taken out of the oven after 2 days while B was taken out after 5 days. After quench cooling of the bombs with running tap water, the bombs were opened and the pH of the supernatants was measured to be 7 to 8 and 8 to 9 for A and B, respectively. The solid products in the autoclaves were centrifuged, washed several times with deionized water until the conductivity of the washing liquid was below 50 µS/cm, and then dried in a 60° C. vacuum oven overnight. Yields were 2.9% and 8.6% for A and B, respectively, based the weight of the initial gel.

Figure 1:
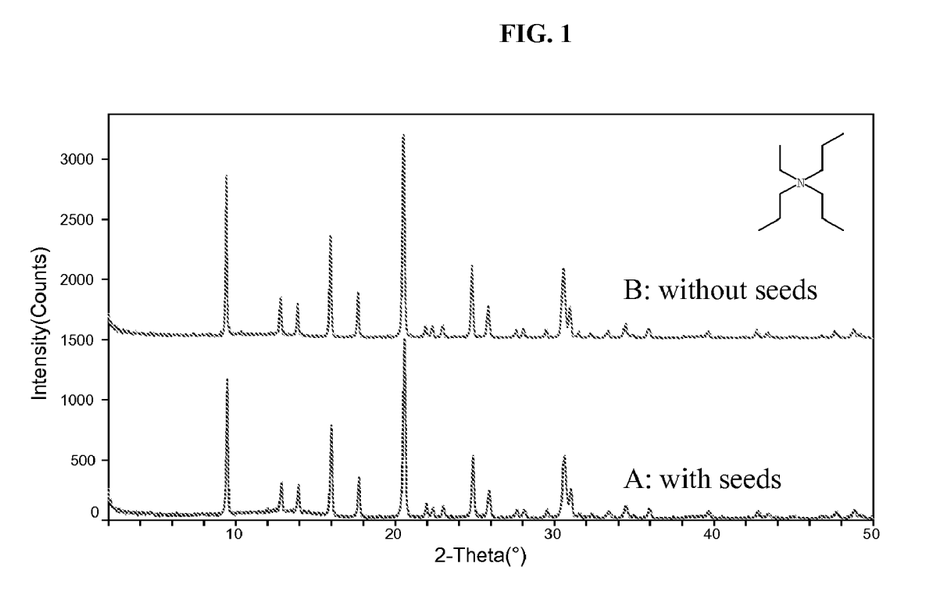
FIG. 1 shows X-ray powder diffraction patterns of the silicoaluminophosphate products of Example 2 produced from seeded and unseeded synthesis mixtures comprising ethyltripropylammonium hydroxide (ETPAOH) as an organic template.

X-ray powder diffraction patterns of the products A and B are shown in FIG. 1, from which it can be seen that the crystalline products are all [Si—Al—P—O], i.e., silicoaluminophosphates, having the chabazite framework. Results of elemental analysis give the following molar compositions: Al$_{1.0}$Si$_{0.181}$P$_{0.825}$ for A and Al$_{1.0}$Si$_{0.169}$P$_{0.828}$ for B.

EXAMPLE 3

Preparation of [Si—Al—P—O]-CHA using MTPAOH as Template

The same procedure as Example 2 was followed, except that MTPAOH was used in place of ETPAOH. The gel compositions were as follows:

2.0 MTPAOH:1.0 $Al_2O_3$:0.3 $SiO_2$:1.0 $P_2O_5$:91 $H_2O$, no seeds for A 2.0 MTPAOH:1.0 $Al_2O_3$:0.3 $SiO_2$: 1.0 $P_2O_5$:51 $H_2O$, with colloidal SAPO-34 seeds for B.

Figure 2:
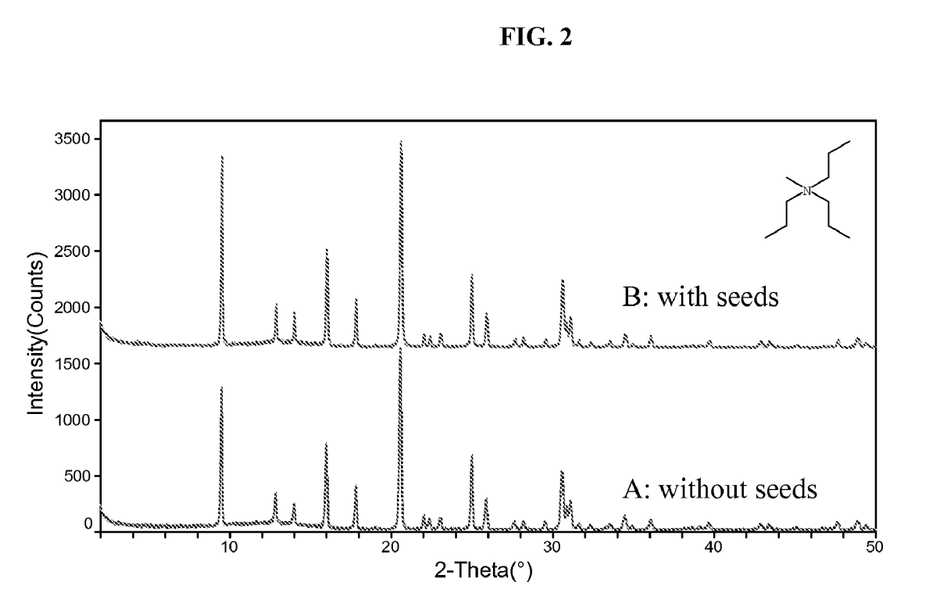
FIG. 2 shows X-ray powder diffraction patterns of the silicoaluminophosphate products of Example 3 produced from seeded and unseeded synthesis mixtures comprising methyltripropylammonium hydroxide (MTPAOH) as an organic template.

Gel A was heated at 180° C. for 5 days and gel B was heated at 180° C. for 2 days, with no agitation. Yields for A and B were 4.3% and 6.8%, respectively. Elemental analysis gave the following molar compositions: $Al_{1.0}Si_{0.190}P_{0.785}$ for A and $Al_{1.0}Si_{0.193}P_{0.729}$ for B. The XRD patterns of the products are shown in FIG. 2.

EXAMPLE 4

Preparation of [Si—Al—P—O]-AEI/CHA Intergrowth using TEPAOH as Template

The same procedure as Example 2 was followed, except that TEPAOH was used. The gel composition was as follows:

2.0 TEPAOH:1.0 $Al_2O_3$:0.3 $SiO_2$:1.0 $P_2O_5$:51 $H_2O$, with 100 PPM seeds

Figure 3:
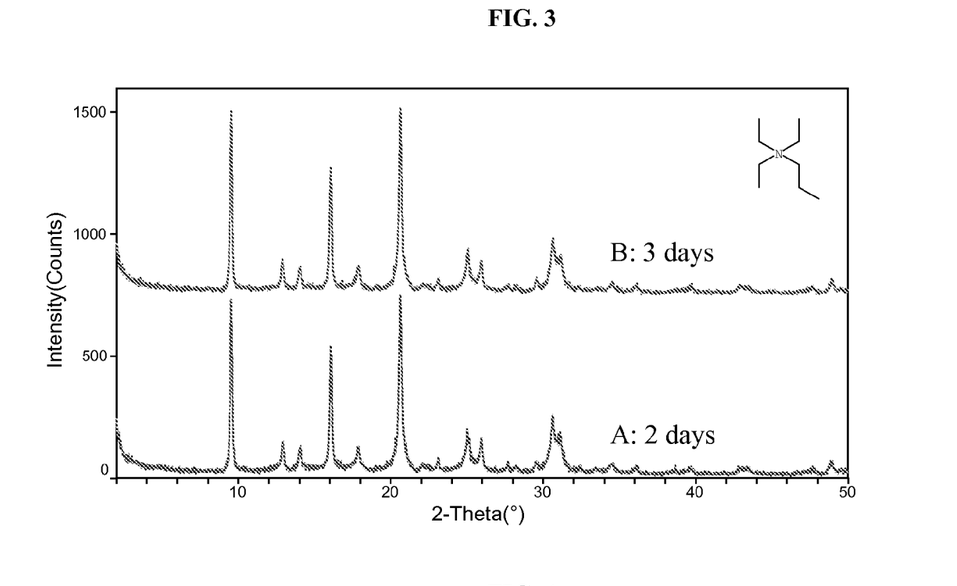
FIG. 3 shows X-ray powder diffraction patterns of the silicoaluminophosphate products of Example 4 produced after 2 days and 3 days of crystallization of a seeded synthesis mixture comprising triethylpropylammonium hydroxide (TEPAOH) as the organic template.

The gel was divided into two equal portions. Gel A was heated at 180° C. for 2 days, and gel B at the same temperature for 3 days, without agitation. Yields for A and B were 7.1% and 10.0%, respectively. Elemental analysis gave the following molar compositions: $Al_{1.0}Si_{0.188}P_{0.800}$ for A and $Al_{1.0}Si_{0.197}P_{0.789}$ for B. The XRD patterns of the products are shown in FIG. 3. The XRD patterns resemble those of AEI/CHA intergrowths having high chabazite character in having sharp and broad peaks. Transmission Electron Microscopy images of the samples show typical stacking faults indicative of intergrowths (not shown).

EXAMPLE 5

Preparation of [Si—Al—P—O]-AEI/CHA Intergrowth using DEDPAOH as Template

Figure 4:
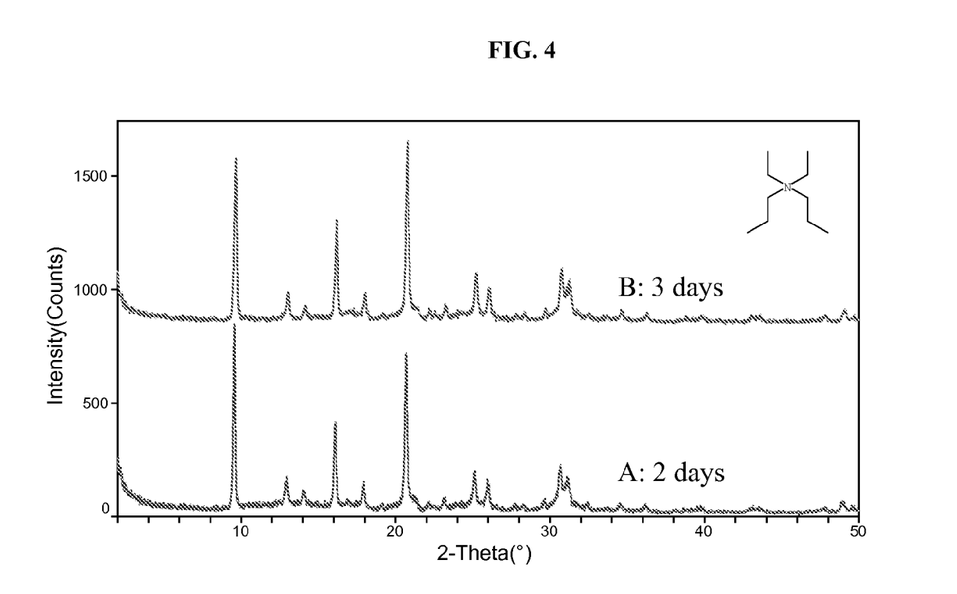
FIG. 4 shows X-ray powder diffraction patterns of the silicoaluminophosphate products of Example 5 produced after 2 days and 3 days of crystallization of a seeded synthesis mixture comprising diethyldipropylammonium hydroxide (DEDPAOH) as the organic template.

The same procedure as Example 2 was followed, except that DEDPAOH was used. The gel composition was as follows:

2.0 DEDPAOH:1.0 $Al_2O_3$:0.3 $SiO_2$:1.0 $P_2O_5$:51 $H_2O$, with 100 PPM seeds The gel was divided into two equal portions. Gel A was heated at 180° C. for 2 days and gel B was heated at the same temperature for 3 days without agitation. Yields for A and B were 7.5% and 9.4%, respectively. Elemental analysis gave the following molar compositions: $Al_{1.0}Si_{0.183}P_{0.757}$ for A and $Al_{1.0}Si_{0.177}P_{0.780}$ for B. The XRD patterns of the products are shown in FIG. 4.

EXAMPLE 6

Preparation of [Si—Al—P—O]-CHA using TPAOH as Template

Figure 5:
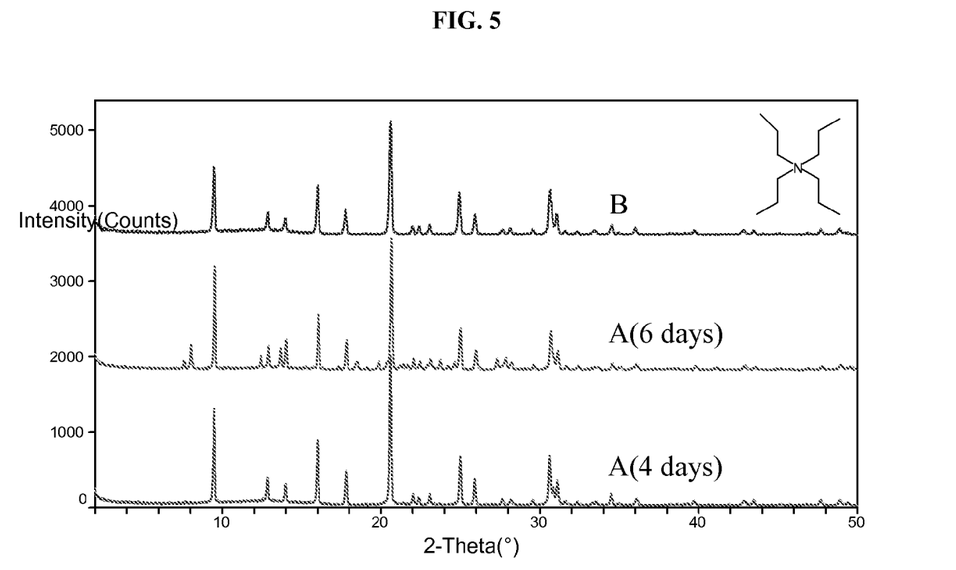
FIG. 5 shows X-ray powder diffraction patterns of the silicoaluminophosphate products of Example 6 produced from seeded and unseeded synthesis mixtures comprising tetrapropylammonium hydroxide (TPAOH) as an organic template.

The same procedure as Example 2 was followed, except that tetrapropylammonium hydroxide (TPAOH, 40 wt % commercial product from Aldrich) was used. The gel compositions were as follows:

2.0 TPAOH: 1.0 $Al_2O_3$:0.4 $SiO_2$:1.0 $P_2O_5$:51 $H_2O$, without seeds, Gel A 2.0 TPAOH:1.0 $Al_2O_3$:0.3 $SiO_2$:1.0 $P_2O_5$:51 $H_2O$, with 100 PPM seeds, Gel B Gel A was divided into two equal portions and was heated at 200° C. for 4 and 6 days without agitation. Gel B was heated at 170° C. for 18 days while being tumbled at 40 rpm. Yields for A(4d), A(6d), and B were 6.4%, 8.1%, and 2.4%, respectively. Elemental analysis gave the following molar compositions: $Al_{1.0}Si_{0.217}P_{0.826}$ for A(4d) and $Al_{1.0}Si_{0.170}P_{0.791}$ for B. The XRD patterns of the products are shown in FIG. 5. The XRD patterns indicate that samples A(4d) and B are SAPO-CHA, while sample A(6d) is SAPO-CHA contaminated with SAPO-40.

Table 3 summarizes the results of Examples 2 to 6:

TABLE 3

| Example | Template | Sample | Product Phase | Yield, wt % | Product Composition |
|---|---|---|---|---|---|
| 2 | ETPAOH | A | CHA | 2.9 | $Al_{1.0}Si_{0.181}P_{0.825}$ |
| 2 | ETPAOH | B | CHA | 8.6 | $Al_{1.0}Si_{0.169}P_{0.828}$ |
| 3 | MTPAOH | A | CHA | 4.3 | $Al_{1.0}Si_{0.190}P_{0.785}$ |
| 3 | MTPAOH | B | CHA | 6.8 | $Al_{1.0}Si_{0.193}P_{0.729}$ |
| 4 | TEPAOH | A | AEI/CHA | 7.1 | $Al_{1.0}Si_{0.188}P_{0.800}$ |
| 4 | TEPAOH | B | AEI/CHA | 10.0 | $Al_{1.0}Si_{0.197}P_{0.789}$ |
| 5 | DEDPAOH | A | AEI/CHA | 7.5 | $Al_{1.0}Si_{0.183}P_{0.757}$ |
| 5 | DEDPAOH | B | AEI/CHA | 9.4 | $Al_{1.0}Si_{0.177}P_{0.780}$ |
| 6 | TPAOH | A(4d) | CHA | 6.4 | $Al_{1.0}Si_{0.217}P_{0.826}$ |
| 6 | TPAOH | B | CHA | 2.4 | $Al_{1.0}Si_{0.170}P_{0.791}$ |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of synthesizing a silicoaluminophosphate or aluminophosphate molecular sieve comprising a CHA framework-type material, the method comprising:
   (a) providing a synthesis mixture comprising a source of aluminum, a source of phosphorus, optionally a source of silicon, and at least one organic template of formula (I):

$$[R^1R^2R^3R^4N]^+ X^- \quad (I)$$

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion; and
   (b) inducing crystallization of said synthesis mixture to form said molecular sieve.

2. The method of claim 1, wherein the total number of carbon atoms in said alkyl groups $R^1$, $R^2$, $R^3$, and $R^4$ is from 9 to 13.

3. The method of claim 1, wherein said organic template is selected from tetrapropylammonium, methyltripropylammonium, ethyltripropylammonium, diethyldipropyl-ammonium, methylethyldipropylammonium, and/or triethylpropyl-ammonium compounds.

4. The method of claim 1, wherein the molar ratio of template to aluminum in the synthesis mixture, expressed as the molar ratio of template to alumina ($Al_2O_3$), is within the range of from about 0.4:1 to about 4.0:1.

5. The method of claim 1, wherein the synthesis mixture also contains seeds.

6. The method of claim 1, wherein said synthesis mixture comprises from about 0.01 ppm by weight to about 10,000 ppm by weight of seeds.

7. The method of claim 1, wherein said synthesis mixture comprises from about 100 ppm by weight to about 5,000 by weight of seeds.

8. The method of claim 5, wherein said seeds comprise a crystalline material having a CHA framework-type.

9. The method of claim 1, wherein said synthesis mixture comprises a source of silicon present in an amount such that said mixture has a non-zero $Si:Al_2$ molar ratio up to about 0.6.

10. An aluminophosphate or silicoaluminophosphate molecular sieve, comprising an CHA framework type material and, within its intra-crystalline structure, at least one organic template of formula (I):

$$[R^1R^2R^3R^4N]^+ X^- \qquad (I)$$

wherein each of $R^1$, $R^2$, $R^3$, and $R^4$ is independently an acyclic alkyl group having at least one carbon atom, the total number of carbon atoms in said alkyl groups $R^1$, $R^2$, $R^3$, and $R^4$ is greater than 8 but less than 16, and $X^-$ is an anion.

11. The molecular sieve of claim 10, wherein said organic template is selected from tetrapropylammonium, methyltripropylammonium, ethyltripropylammonium, diethyldipropyl-ammonium, methylethyldipropylammonium, and/or triethylpropylammonium compounds.

12. The molecular sieve of claim 10, further comprising an AEI framework type material.

\* \* \* \* \*